United States Patent Office 3,340,911
Patented Sept. 12, 1967

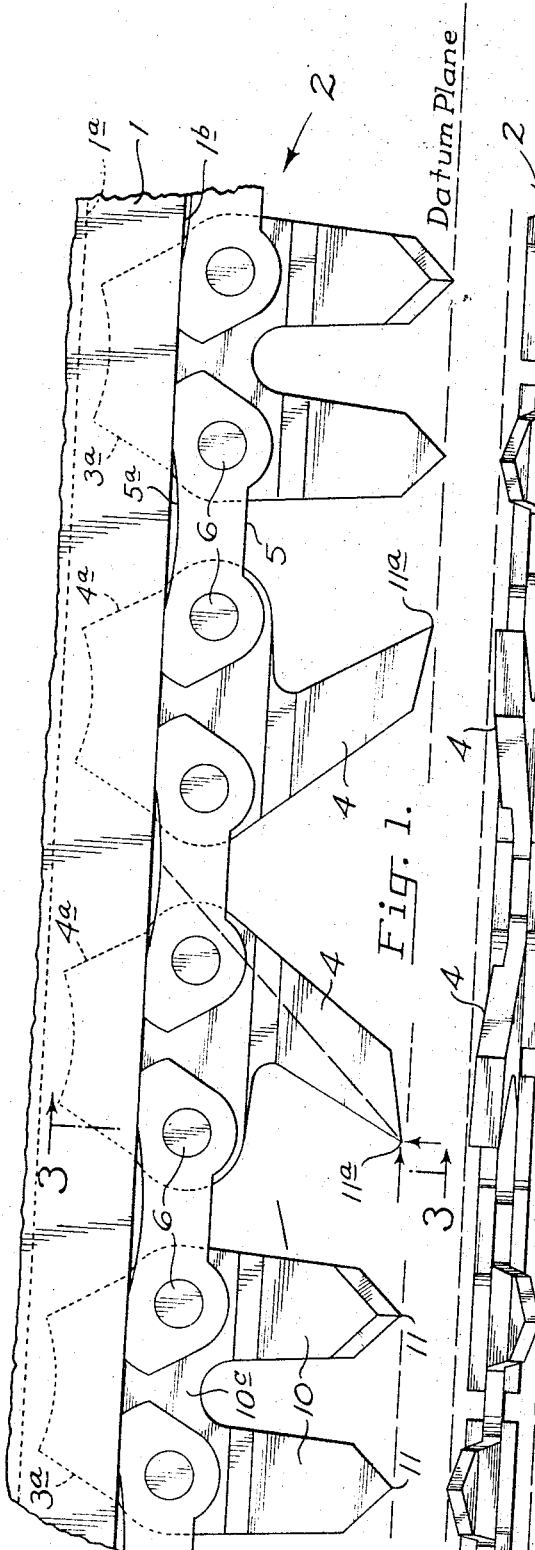
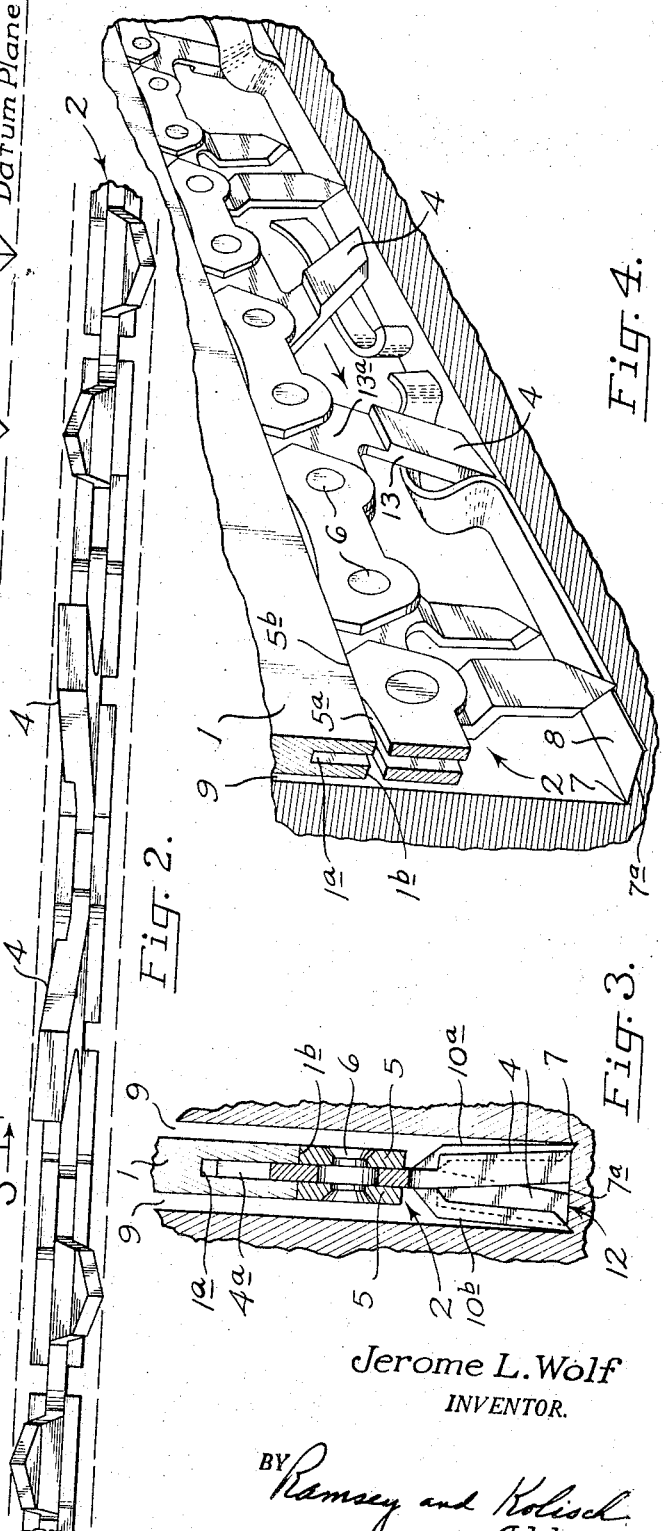
Jerome L. Wolf
INVENTOR.
BY Ramsey and Kolisch
Attys.

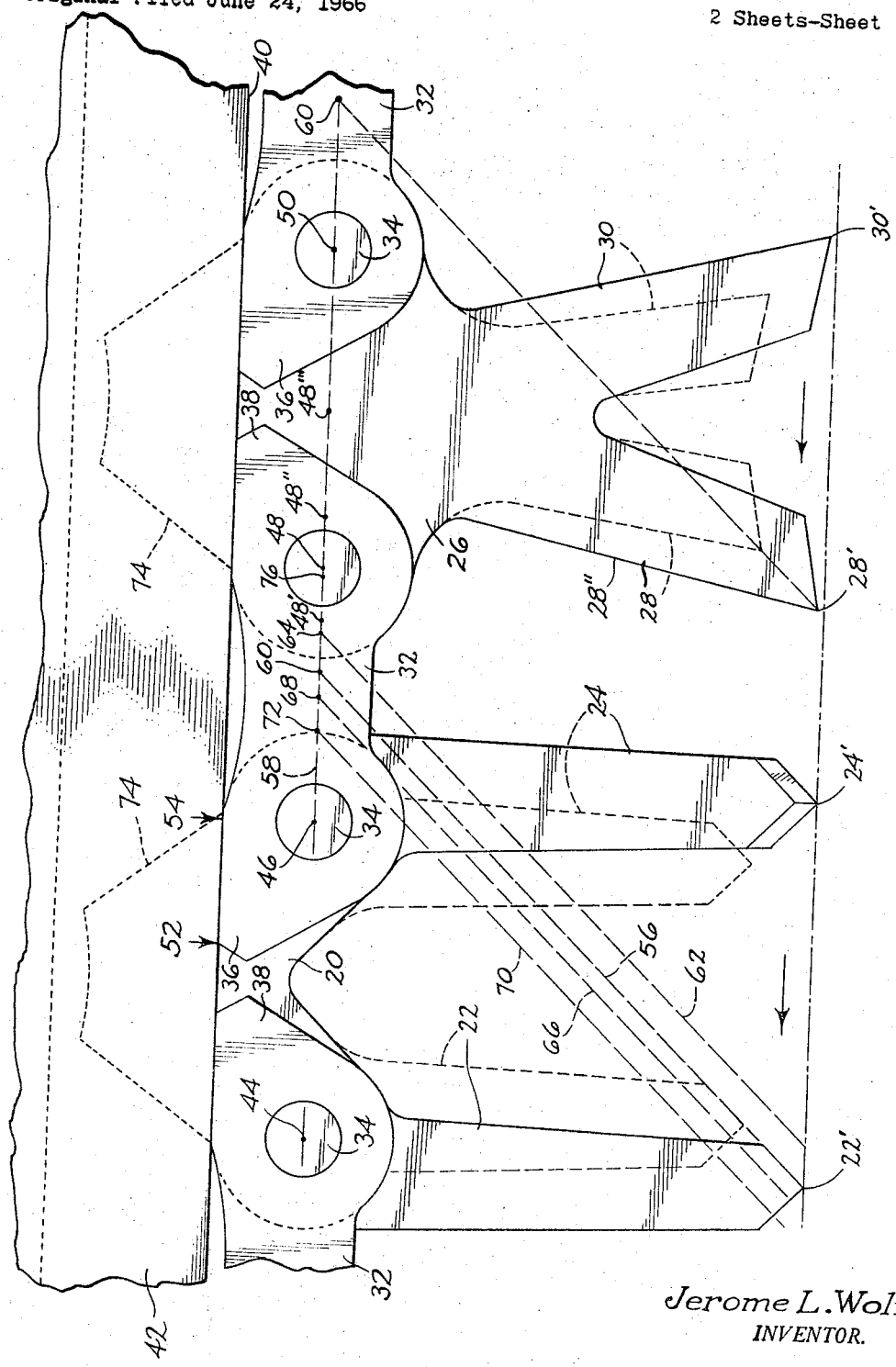

3,340,911
CHAIN SAW
Jerome L. Wolf, 1310 Harney St.,
Vancouver, Wash. 98660
Continuation of application Ser. No. 564,483, June 24, 1966. This application Dec. 23, 1966, Ser. No. 611,519
12 Claims. (Cl. 143—135)

This application is a continuation of my earlier filed application filed June 24, 1966, under Ser. No. 564,483.

My invention relates to chain saws and particularly that type comprising separate cutting and raking teeth, hereinafter referred to as cutters and rakers. This is the type of chain saw illustrated in United States Patent No. 2,391,286, issued Dec. 18, 1945, to Wolf. Another type of chain saw which enjoys present vogue is that type generally referred to as one having router teeth such as is illustrated in United States Patent No. 2,705,512, issued Apr. 5, 1955, to Wolf.

Saws for many years, such as band saws and blade saws, have utilized separate cutters and rakers. It is generally accepted that a saw having separate cutters and rakers will cut more smoothly and with less effort than other types of cutting teeth. They are thus characterized as precision cutting chain saws producing a straight and uniform kerf, that cut to a line, as opposed to a cut-off or bucking saw.

In chain saws it has been possible to provide adequate cutting action, that is chip production. Inasmuch as a chain saw uses a blade which approximates in length the diameter of a log to be cut, there is little unexposed saw blade and the chain moves constantly in one direction. Thus, the saw forming a kerf must work through a large quantity of chips and sawdust that frequently exceeds the chip-carrying capacity of a saw. Many efforts have been made to overcome this difficulty. This problem is discussed with some particularity in Wolf, No. 2,391,286. That is, chain saws comprising cutting and raking teeth have adequate cutting capacity, but they will not feed smoothly through a log and deliver the chips and sawdust therefrom because they have insufficient chip-carrying capacity. The principal difficulty is that the raker teeth are compelled to perform their dual function of chip breakers and chip carriers, simultaneously.

At the time and place that chips are being broken away from the floor of the kerf and are being pushed forwardly along said floor they constitute dams for preventing chips from filling the entire space between rakers. That is to say, when the chips are being cut from the floor they are immediately pushed along the floor of the kerf and because of the speed at which the saw is travelling, it is difficult for them to pile up and push forward ahead of the raker. Thus, they can only be crowded into the gullet of the raker which has limited capacity. Thus, the carrying capacity of each raker tooth is limited to that quantity of chips and sawdust which can be crowded behind the dam of chips being broken loose from the floor of the kerf.

I have discovered that the chip-breaking duty of a raker can be separated from its chip-carrying function. This can be effected by causing the chips broken loose to tip laterally about and pass to one side of the raker. I have discovered, in connection with my work with Douglas fir and similar so-called soft woods, that most chips can be broken loose from the floor of the kerf, when sawing directly across the grain, by rakers having an effective width of approximately one-fifth or 20% of the kerf width, even if the raker is located adjacent one side of the kerf being cut. Then ripping or sawing obliquely across the grain, a raker must have an effective width of up to 50% of the kerf being formed. This is likewise true when sawing harder and more closely grained wood and when sawing wood that has a large number of knots therein. There is no grain in a knot and thus, when chipping it from the floor of a kerf it tends to crumble or form dust rather than chips.

The optimum width to promote clean chip breakage and unimpeded passage about the raker teeth is about one-third or 35% of the kerf width. The critical limits are from about one-fourth or 25% of the kerf width to slightly below one-half or 50% of the kerf width, and at one side of the center line of said kerf.

Within said limits a chip may be broken off from the floor of the kerf and bypassed about the raker. There is some drag imposed upon the chips broken off and the drag thus effected causes the chips broken off and bypassed by a preceding raker to pile up ahead of the dam of chips being cut off by a following raker. Thus, the entire longitudinal space between rakers may constitute a chip storing and carrying space corresponding to an elongated longitudinal gullet in a band or blade saw. The chips flow relatively rearwardly from one raker to the following one and do not pack about the chip while it is being broken off by any given raker. Thus, is does not interfere with the chip-breaking function of each of the raker teeth. That is to say, the chips flow relatively rearwardly and are not compelled to travel forwardly into a chip-carrying space ahead of the raker tooth. Thus, large quantities of chips can be carried by a chain saw without producing compaction and imposition of severe frictional losses to a chain saw embodying the foregoing construction. Such a chain saw runs free, the raker teeth are unimpeded to perform their chipping function and the tooth spacing may be adjusted to balance the chip-carrying capacity of a saw to its cutting ability. I have observed that without such balance greater chain speed, more applied power and greater tooth length and sharpness do not increase the cutting ability of the chain saw, substantially.

I have discovered that if the cutters and rakers are spaced apart by supporting links or blocks devoid of teeth, the chips and sawdust are permitted to flow past the raker teeth that form said chips, a saw can be produced that will cut faster than a so-called router tooth chain, with much greater ease, less kerf width, truer, straighter and with less frequent filing.

It is the principal object of my invention to provide a so-called precision cutting chain saw having separate cutting and raking teeth with sufficient chip carrying capacity so that the chips cut from the floor of a kerf and broken loose by raker teeth may bypass the raker teeth laterally when they are broken loose from the floor to flow rearwardly and accumulate ahead of the next following raker tooth.

A further object of my invention is to provide a chain saw of this character having widely spaced cutting teeth and raker teeth, respectively, which teeth are operatively stable, will run free and be inhibited against tipping and gouging.

Other and further objects and features of my invention are hereinafter described with reference to the accompanying drawings, in which:

FIG. 1 is a fragmentary elevation of a section of saw chain embodying my invention;

FIG. 2 is a plan view of such section of saw chain illustrating the manner in which the teeth are longitudinally and laterally spaced from each other;

FIG. 3 is a transverse sectional view taken on the line 3—3 in FIG. 1, illustrating the relation of the saw chain and its blade with respect to a kerf being formed thereby;

FIG. 4 is a perspective view of said section of saw chain embodying my invention illustrating the manner in which said chain cuts and routes out wood from the floor of a kerf, and bypasses it laterally around each raker tooth to permit chips to move back relatively ahead of the next succeeding raker tooth; and FIG. 5 is a fragmentary side elevation of a section of saw chain embodying my invention and showing graphically thereon the effects of varying the dimensions of chain components.

A chain saw embodying my invention comprises the usual bar 1, about which a saw chain 2 is trained. My invention is adapted to either that type of bar which has a central recess formed therein in which tangs of a saw tooth ride or that type in which the tangs are bifurcated and straddle a projecting narrow section, sometimes referred to in the art as a monorailtype bar. I have illustrated my invention in connection with a bar in which a central groove 1a is formed. Cutting teeth 3 and raker tooth 4 have tans 3a, 4a, respectively, projecting inwardly into said central groove and riding therein as is illustrated in FIG. 1. Connecting each of said raker teeth or cutting teeth with each other in a chain are interconnecting block links 5. Said block links are arranged in spaced pairs with the tooth links lying between them and joined therewith by pins, rivets or other pivotal connections 6. Said block links bear upon the edges 1b of the bar 1 at each side of the central groove, as is illustrated in FIG. 3. That is to say, the tooth links do not sustain directly any lateral pressure exerted by the bar 1 when the chain saw is operating. Said forces are carried directly by the upper edges 5a of the block links 5 and are transmitted through the pivotal connections 6 to the saw teeth and through said teeth to the wood being cut. Said block links have flattened end portions 5b extending beyond the pivotal connections. That is to say, said block links are elongated to a substantial degree with respect to the pivotal connections thereof. Said elongations project longitudinally both forwardly and rearwardly of the two pivotal connections for each of said block links. Said projections carry said flattened end portions, which bear directly upon the edges 1b of the cutter bar. Said flattened ends serve as elongated levers to tend to cause the chain to run in a straight line parallel with the edge surfaces 1b of the bar and tend to prevent the teeth from rocking or canting while in operation.

This is particularly important with the raker teeth while they perform their chip-breaking function. In routing out the floor of a kerf they tend to rotate about their pivotal connection with the remainder of the chain and to dig in and gouge. The projecting flat edges 5b resist such tipping or rotational tendency and said teeth are stabilized because the forces developed lie within the overall length of the block links, as described hereinafter, so that the latter do not tend to be lifted from contact with the edges 1b of the bar, and thus, progress smoothly in a straight line to produce chips of uniform thickness. By reason of this construction, the saw chain saw, although articulated, will function in cutting in a manner similar to a solid blade saw without locking the links together. In other words, each tooth link is rotationally stable in the chain which is produced by the position and construction of the block links 5, which being enlongated and having flattened end plates extending longitudinally beyond the pivot points, inhibit rotation of the tooth links.

I have determined that it is critical that the cutting teeth 3 be jointed so as to be slightly longer than the raker teeth 4. This is illustrated in FIG. 1, with respect to a line which carries the legend "datum plane." They should be jointed sufficiently long so that gutters 7 will be formed at the margins of the floor 8 of saw kerf 9, as is illustrated most clearly in FIG. 3. If the gutters are cut substantially twice as deep as the thickness of the chip to be broken from the floor of the saw kerf, the chips will be broken loose from the floor easily and effectively.

In the drawings I have illustrated the cutting teeth 3 as being of inverted U-shaped form, having two depending tooth elements 10, spaced apart longitudinally of the saw chain and laterally of the saw kerf, as is illustrated most clearly in FIGS. 2 and 3. That is to say, one tooth element 10a constitutes a right-hand cutter and another 10b a left-hand cutter. Each of the cutter tooth elements is elongated, as is shown in FIG. 1, and terminates in a sharpened point 11 of conventional cutting tooth pattern. At each side of said point and sloping obliquely upwardly is a cutting edge 12. In viewing the drawings, it is illustrated that the saw will run from right to left, as shown by the arrow in FIG. 4. The saw chain and the teeth elements are capable of being operated in the opposite direction with equal facility. By making the saw chain capable of operating in either direction, it effectively increases the cutting life of a saw approximately twice and requires only that the saw chain be turned end for end when one edge becomes dull. The raker teeth 4 are also arranged, in the embodiment illustrated, in related pairs. Each raker tooth in a pair faces the opposite direction with respect to the other raker in the pair. It is to be understood that my invention is not limited to this particular tooth arrangement. It is only one embodiment illustrated and described as a preferred arrangement.

Raker teeth are preferably arranged so that each tooth portion 13 thereof is substantially thicker than the body portion 13a thereof. This is shown most clearly in FIG. 4, in which the body portion 13a or gauge of a raker tooth is about the same thickness as that of the body portions 10c of the cutting teeth and the thickness of the block links 5. The depending tooth portions may either be made by upsetting the blanks to double thickness or else blanks having a thickness of the tooth portion may be used and the body portion 13a be milled, coined, or otherwise cut away. Said teeth also may be forged in which the material may be either flattened out or upset to produce this difference in thickness.

So that some relations may be visualized, let is be assumed that the width of the saw kerf in FIGS. 3 and 4 is 5/16", which is a common present dimension. The bodies of the raker teeth and the cutting teeth are 1/16" in thickness. This is also true of the block links 5. The wider tooth portion 13 of raker teeth 4 is 7/64". The effective length of the tooth elements 10 of the cutter teeth is 27/32" and the effective length of the tooth portions 13 of the raker teeth are 13/16". That is to say, the raker teeth have an effective length 1/32" shorter than the corresponding parts of the cutter teeth. The length of the teeth is measured from the center of the holes through which the pins, rivets or other pivotal connections 6 pass and the tip or the farthest extremity of the cutter and raker teeth, respectively. The body portions 13a of the raker teeth and 10c of the cutting teeth are coplaner with the sides of the cutter bar, as is illustrated in FIG. 3. The tooth portions are angularly offset, as is illustrated in FIG. 3.

The points 11 of the left and right hand cutter teeth in each pair are separated to stand 5/16" apart and to produce a kerf of such span. The thickened tooth portions 13 of the raker teeth are offset angularly so that they lie wholly to one side of the center line of the kerf being formed. The outer margins of each of said tooth portions 13 lie inwardly of the sides of the kerf a distance substantially equal to the width of the gutter 7 formed on that side. This relationship is maintained so that a chip broken from the floor by each raker tooth is planed or chiseled from the floor of the kerf at one side of the center line from the raised land 7a, lying between the pairs of gutters at the margins of the kerf. All of the foregoing dimensions are illustrated in FIG. 4. The material chipped from the floor of the kerf is shown as a more or less broken ribbon. This drawing exaggerates the usual effective length of chips removed from the floor, particularly those produced when cutting across grain, which is the usual manner in which saw chains are used in cutting wood.

As may be noted by reference to said figure, the raker teeth 4 follow two swaths, one at each side of the floor of the kerf and first a left hand raker will chisel or plane said ribbon between the gutters and lift it up from the floor and permit it to pass to its right. At the extreme right hand end of said drawing a right hand raker lying more closely adjacent the distant wall surface of the kerf breaks another ribbon from the floor and permits it to pass to its left. The ribbon being cut from the floor of the kerf tends to be bent up sharply, as is shown. This usually produces fracture at this point, rather than continuity as is illustrated in said figure. In any event, it produces a vertical dam which inhibits chips produced by a preceding raker from flowing past this point. By permitting this ribbon (either continuous or in separated chips) to be lifted from the floor, turned laterally, as is illustrated, so as to pass one side of the raker, facing the center line of the kerf and to flow past the following teeth, both rakers and cutters, the ribbons or so called whiskers, and the broken chips may pile up upon the dam produced in the removing of materials from the floor of the kerf by the next succeeding raker.

Thus, the entire span between rakers in a related pair may provide chip carrying capacity without interfering with the chip forming function of either of the rakers. Such chip carrying space in a saw of the tooth pattern illustrated and of the size heretofore mentioned is six links long and produces a saw pitch of 3¾" between repeating tooth patterns. This is to say, a ribbon produced by the forward raker tooth illustrated in FIG. 4, may pass said tooth, progress rearwardly the length of the next block link, the length of the next reversely arranged raker, the next block link, the next pair of cutter teeth link and the block link joining said cutter teeth to the following opposite hand raker.

Although the principal feature of my invention is the effective utilization of the entire space between rakers as chip carriers in a chain saw, it has some incidental factors. By permitting the chips to be twisted so that they will pass edgewise around the rakers, it also increases the time factor, as well as that of space. By that I mean, if the chips cut from the floor of the kerf are permitted to separate and flow, rather than be crowded, relatively rearwardly in the kerf, they may gather in front of the next trailing raker in a puffy, noncompacted condition.

I have observed that if the chips are carried forward in the kerf, immediately in front of the raker which removes them from the floor of the kerf, they are tightly jammed into a compact mass. Such mass develops substantial friction within the kerf which produces substantial power loss. The friction also develops heat in the saw chain and the heat also is given to the chips removed in the kerf. This produces expansion of the chips and increases the frictional drag. The heat generated in the saw chain causes the parts to expand and produce interference with the articulation thereof, as the chain passes over the sprocket at the end of the cutter bar. The chain in passing through the kerf develops substantial lineal speed in the order of between 1200 and 3600 feet per minute. This produces substantial blasts of air which tend to carry along the chips if they are separated and unpacked but have no substantial effect upon chips that are massed. Thus when the chips tilt and pass the raker teeth and feed slowly past to be caught by the dam produced by chips formed by a succeeding raker, they are given time to separate and be affected by said blasts of air which produce a physical carrying function, as well as a cooling function.

Said blasts of air are augmented and directed when raker teeth having widened end portions 13 are provided. These act like paddles passing transversely through the kerf. Inasmuch as the widened tooth portions terminate at the body portion 13a they produce two jets, one within the saw kerf passing about the sides of the raker teeth as well as the cutters, particularly when they are inclined at an oblique angle to the side walls of a kerf. Another jet passes over the tops of the widened tooth portions 13, which tends to blow any fine dust from around the pivot joints 6 and from between the pairs of block links which join the tooth links, both cutter links and raker links. The separation of the tooth links from each other by block links provides longitudinal spacing and the direction of the chip flow past the sides of the raker teeth with consequent turbulence and permits the utilization of the entire capacity of the space between the raker links. It also provides a time interval in which saw dust and chips may separate one from the other and accumulate in a relatively fluffy condition forwardly of the succeeding raker which breaks a full chip from the floor of the kerf. Thus, time and flow of air past and around the links of a chain embodying my invention aid in the movement of sawdust through the kerf and out the discharge end thereof.

Longitudinal stability of the saw chain is achieved in the manner illustrated in FIG. 5 of the drawings. The chain shown therein is of the reversible type, as in FIG. 1, and includes a cutting tooth link 20 carrying the longitudinally spaced cutting teeth 22 and 24, and the raker tooth link 26 carrying the longitudinally spaced raker teeth 28 and 30. The cutting and raker tooth links are interconnected pivotally by the block links 32, by means of the pins 34, and each block link includes extensions 36 and 38 which project longitudinally from the pivot pins 34 and bear slidably upon the supporting edge 40 of the saw bar 42. Assuming the direction of movement of the chain to be from right to left, as indicated by the arrows, the leading teeth are 22 and 28 and the leading extensions are 36. In this direction of movement significant upsetting forces will be impressed only upon the leading teeth 22 and 28. It will be understood that if the chain movement is reversed the upsetting forces will be impressed upon the teeth 24 and 30 which then will be the leading teeth.

In the chain illustrated in FIG. 5 the distance between the pivot centers 44–46 and 48–50 on the cutter and raker tooth links 20 and 26, respectively, is different from the distance between the pivot centers 46–48 on the block links 32, as distinguished from the equal spacings illustrated in the embodiment of FIG. 1. For the purpose of the following discussion, let it be assumed that the spacing between tooth link pivot centers 44–46 and 48–50 is ¾", that the length of the leading extension 36 on the block links between points 52–54 is 5/16", and that the distance between pivot centers 46–48 on the block links is ⅝".

Because of the provision of leading extensions on the block links, longitudinal stability of the saw chain is maintained through the action of vertical forces only. It can be established mathematically, by the summation of moments about the points 46, 48 and 52, that for the dimensions exemplified above the line of action 56 of the resultant force impressed upon the leading cutting tooth 22 by the wood can intercept the line 58 extended between pivot centers as far rearward of the leading block link pivot center 46 as the point 60, while still maintaining longitudinal stability. This distance 46–58 is ⅜". Further, it can be shown mathematically that as this point 60 of force application is moved forwardly toward and beyond the leading block link pivot center 46, by forward movement of the line of action 56, the stability of the saw chain progressively increases.

The location of point 60 relative to the leading block link pivot center 46 is independent of the slope of the line of action 56. That is to say, regardless of whether the vertical or horizontal forces impressed upon the tooth are equal, providing a line of atcion having the slope of 45° as illustrated, or are unequal and thus provide a line of action having a slope other than 45°, the line nevertheless must be drawn through the point 60.

The slope of line 56 governs the maximum allowable height of the associated tooth. That is to say, the chain will remain longitudinally stable so long as the cutting tip 22' of the tooth terminates between the line of action and the saw bar. However, it will be understood that the ultimate height of the tooth will be determined by the position of the cutting tip 22' relative to the pivot center 44 in the longitudinal direction of the chain. For example, in FIG. 5 the cutting tip 22' leads the pivot center 44 in the direction of the movement of the chain, and thus may have the maximum length illustrated. If the cutting tip is aligned with the pivot center 44, in the manner illustrated in FIG. 1, or if it is positioned to trail the pivot center 44, as illustrated in dotted lines in FIG. 5, the maximum length of the tooth is corresponding shortened because of the slope of the line 56.

Let it now be assumed that the spacing between the pivot centers 46–48 of the block links is shortened to the distance 46–48', and that the spacing between pivot centers on the tooth links and the leading extension on the block links remain the same as previously described. It can be demonstrated mathematically that under these dimensional relationships the line of action 62 of the resultant force must intercept the line 58 no farther rearward of the leading block link pivot center 46 than the point 64. Since the slope of the line 62 is the same as the line 56 previously described, it will be appreciated that the length of the tooth 22 may be extended to the maximum determined by the line 62.

Conversely, if the spacing between pivot centers on the block link is lengthened to the distance 46–48", which is the same distance as the spacing between pivot centers on the tooth links, the line of action 66 of the resultant force must intercept the line 58 no further rearward of the leading pivot center 46 than the point 68. It is of interest to note that this distance 46, 68 is equal to the length 52–54 of the leading extension 36 on the block link 32.

Similarly, if the spacing between pivot centers on the block link is extended to the distance 46–48''', then the line of action 70 of the resultant force must intercept the line 60 no farther rearward of the leading pivot center 46 than the point 72.

It will be noted in the case of the last two illustrations of dimensions that the lines of action 66 and 70 are positioned ahead of the first described line of action 56 and that the maximum height of the tooth 22 is reduced correspondingly.

In the foregoing illustration of dimensions, reference has been made to the maximum length of teeth. It will be appreciated that, under certain elections of dimensions, the length of the teeth may be so much greater than the length of the tooth link tang 74 which guides the tooth along the saw bar, that insufficient lateral stability will be provided for practical utilization of the chain. In such instances, however, it will be understood that the teeth need not be provided in the maximum lengths allowable.

It will be apparent that the spacing between tooth link pivot centers and the distance of such centers from the supporting edge 40 of the saw bar, will determine the maximum length of the extensions on the block links. For example, in the reversible chain construction illustrated in FIG. 5, the maximum block link extension is slightly less than one half the spacing between tooth link pivot centers. Greater block link extension may be provided in a unidirectional chain, since the trailing ends of the block links need not be provided with extensions. By thus increasing the length of the leading extension on the block links, the illustrated points 60, 64, 68 and 72 may be moved correspondingly farther rearward of the leading block link pivot center 46.

For example, if the chain illustrated in FIG. 5 were made unidirectional and the trailing block link extensions eliminated and the leading extension lengthened to one half inch, the line of action of the resultant force could then intercept the line 58 at the point 76. This distance 46–76 is 0.6".

Thus, it will be apparent from the foregoing that there exists the dimensional relationship $F/E = T/B$, wherein F is the maximum allowable distance between the leading block link pivot center and the point of interception of the line of action of the resultant force on the line 58 between pivot centers, E is the length of the leading block link extension 52–54, T is the spacing between pivot centers on the tooth link, and B is the spacing between pivot centers on the block link.

Although the foregoing discussion has made reference to the leading cutting tooth 22, the dimensional and force relationships also apply to the leading raker tooth 28. Moreover, since these relationships are directed to longitudinal stabilization of the chain, they are effective regardless of the width of the teeth relative to the kerf width. Thus, the raker teeth may extend substantially the full width of the kerf without adversely affecting longitudinal stability of the chain. However, it has been explained hereinbefore that the width of the raker teeth preferably is less than half kerf width for most effective cutting operation.

In the saw chain construction of this invention the cutting teeth and raker teeth shorten in length toward the saw bar as they are worn or resharpened. Thus, it will be observed that if lines of action of resultant forces are drawn from the cutting tips of the shortened teeth, parallel to the original lines of action, the new lines intercept the line 58 forwardly of the maximum point determined by the original line of action for the corresponding dimensions of pivot center spacings and block link extensions. Accordingly, it will be appreciated that as the teeth are progressively shortened, the longitudinal stability of the saw chain progressively improves.

The only condition required to maintain this enhancement of stability during reduction in length of teeth, is that the leading working edge 28" of the raker teeth be located below the line of action, i.e. between the line of action and the saw bar. Thus, in the case of the illustrated 45° line of action, the leading working edge of the raker tooth must form with the line 58 an included angle of at least 45°.

Various patterns and saw pitch spacings may be made within the scope of my invention in which an elongated chain saw comprises a plurality of successively related tooth and block groups, each group comprising pivotally joined links or blocks each joining alternate cutter teeth and raker teeth spaced longitudinally from each other in said group. The tooth cutting links are each separated from the other by related pairs of block links constituting the bar engaging members and affording stability against rotation for all of the link carrying teeth. To this end, the non-tooth carrying links or blocks have elongated portions engaging the edges of the saw blade extending longitudinally beyond the pivotal connection of the links and thus giving each a broader base for the link carrying teeth.

The following examples of arrangement of teeth are discussed in addition to the preferred modification shown. Each involves groups in which plural cutting teeth are arranged successively with either single or double oppositely faced rakers arranged intermediate the cutting teeth. A tooth pattern arranged in a chain in said manner could involve a saw pitch of 5 inches when the teeth are thus arranged.

Another pattern includes a double-faced raker tooth lying intermediate pairs of cutting teeth, said rakers and said cutting teeth each being mounted upon a common link and spaced by block link. Such a chain may have a saw pitch of 2½ inches.

Another tooth grouping involves cutting teeth on successive links followed by a unidirectional raker which will produce a saw pitch of 3½ inches. Such tooth formation and spacing makes my invention particularly usable in cutting hard and frozen lumber.

If it is desirable to increase the saw pitch, to say 5¼ inches, this may be done by adding to said series between the raker tooth and the succeeding cutter tooth, an alinement tooth. If an alinement tooth is used, it is approximately the same over-all height as the raker tooth that it follows and the alinement tooth is in longitudinal alinement with said raker tooth. It is a noncutting tooth and serves as a depth gauge to support two pairs of block links between a raker tooth and a pair of cutting teeth.

A saw chain may have a tooth pattern developing a saw pitch of 5¼ inches comprising two successive cutter links followed by a raker link. The cutter links and the raker links may be of the so-called scratcher-type, which are sharpened by filing the forward edges thereof, rather than the ends, as is shown in the drawings.

I do not deem it essential that the raker teeth should produce only two swaths, one on each side of the center line of the kerf. They may be alined so that within the gauge of the bar 1 two opposed rakers, one on each side of the center line, would follow a path up to the midline and then two succeeding rakers would follow a path from the extreme edge of the saw kerf overlying the gutter to a point short of the opposite side of the midline. I deem it essential, however, that where double raker teeth follow four separate paths, that a raker on a left hand side of the midline should be followed by one on the right hand side, although it isn't essential that successive rakers be offset from the center line equal degrees. Although a saw of this character would have a saw pitch of 2½ inches between cutting teeth, a complete series of double path rakers would occupy a span of 10 inches upon a chain embodying teeth arranged in this fashion. Saws having rakers following four separate paths in a kerf are particularly designed for ripping and avoid furrowing of the saw kerf where the raker cannot pull a full chip from the kerf floor, as is possible in crosscut sawing. Tooth patterns having rakers arranged to follow four separate paths do not depend upon the crumbling of knots to insure that the floor is cut smooth and clean during each saw pitch.

All of the several tooth groupings and arrangements are by way of illustration of various forms that my invention might take. By arranging the rakers at one side of the midline of the kerf and causing the raker teeth to be somewhat less than one-half of the width of the saw kerf, chips, dust and ribbons chiseled from the floor are lifted, turned edgewise and flow past the raker teeth so that each raker tooth is required only to perform a single function, namely to chisel wood from the floor of the kerf. Chip carrying, normally performed as a function of the raker forming said chip, is carried out by the succeeding raker and chips are prevented from moving into the succeeding raker's gullet by reason of the dams set up in front of each raker as a chip is being lifted from the floor of the kerf, in the manner illustrated in FIG. 4 of the drawings.

Saw chains embodying my invention may have separate longitudinally spaced cutting and raker teeth of conventional pattern rather than those of the routing-type teeth. Each chain will have a chip-carrying capacity effectively greater than a chain having routing-type teeth. Precision cutting and smooth action will be produced and saw chip accumulation producing drag, will be inhibited.

Having now described my invention, I claim:

1. An elongated saw chain adapted to traverse a saw bar, comprising
   (a) a plurality of successive related groups of pivotally joined links carrying alternate cutter teeth and raker teeth spaced longitudinally from each other in said chain, being spaced apart by links devoid of cutting teeth,
   (b) the raker teeth having cutting edges approximating one third of the width of the kerf to be formed by the saw chain, each of said edges having its inner end spaced from the midline of the kerf, at the floor thereof,
   (c) successive raker teeth having cutting edges lying at opposite sides of the longitudinal center line of the saw chain,
   (d) at least one link carrying a cutter tooth defining a margin of the kerf to be formed, said link being interposed between links carrying a raker tooth,
   (e) at least the non-tooth-carrying links joining the raker tooth-carrying links having saw bar engaging portions extending longitudinally beyond the pivotal connection with the raker tooth links.

2. The saw chain of claim 1 wherein said at least one link carries two cutter teeth defining margins of the kerf to be formed.

3. The saw chain of claim 1 wherein all of the non-tooth-carrying links have saw bar engaging portions extending longitudinally beyond the pivotal connection with links carrying teeth joined therewith.

4. The saw chain of claim 1 wherein each of the cutter teeth diverges from the center line of the saw chain adjacent the saw bar toward the margins of the saw kerf.

5. The saw chain of claim 1 wherein each of the cutter and raker teeth diverge from the center line of the saw chain adjacent the saw bar toward the margins of the saw kerf.

6. The saw chain of claim 1 wherein each raker tooth is of substantially uniform width from its cutting edge to a point adjacent, but spaced from the saw bar.

7. A saw chain comprising
   (a) a succession of alternate tooth and non-tooth links connected together pivotally,
   (b) the non-tooth links having saw bar engaging portions extending longitudinally beyond their pivot connections with tooth links at least on the leading ends thereof,
   (c) the tooth links supporting raker and cutter teeth of the type having sharpening edges at their outer ends,
   (d) the raker and cutter teeth being arranged relative to the non-tooth links such that the line of action of a resultant force projecting in the trailing direction of saw chain movement from the cutting tip of each tooth intercepts a line between pivot centers at a point no farther rearward of the leading non-tooth link pivot center than a distance F determined by the equation $F/E = T/B$ wherein E is the length of the leading saw bar engaging portion of the non-tooth link, T is the spacing between pivot centers on the tooth link, and B is the spacing between pivot centers on the non-tooth link,
   (e) the cutting tip of each tooth terminating between the associated line of action and the saw bar throughout the operative length of said tooth,
   (f) each raker tooth having a leading edge provided with a positive rake angle, and which edge forms with a line extending between its pivot centers an included angle greater than the corresponding included angle between said pivot center line and the line of action,
   (g) whereby the line of action associated with each tooth progresses in the direction of saw chain movement as the tooth is worn and resharpened.

8. The chain saw of claim 7 wherein the cutting tips of the raker and cutter teeth lead the associated leading pivot centers on the tooth links in the direction of saw chain movement.

9. The chain saw of claim 7 wherein the cutting tips of the raker and cutter teeth trail the associated leading pivot centers on the tooth links in the direction of saw chain movement.

10. The chain saw of claim 7 wherein the spacing between non-tooth link pivot centers is greater than the spacing between tooth link pivot centers.

11. The chain saw of claim 7 wherein the spacing between non-tooth link pivot centers is less than the spacing between tooth link pivot centers.

12. A saw chain comprising
    (a) a succession of alternate cutting tooth links and links devoid of cutting teeth connected together pivotally, (b) the links devoid of cutting teeth having saw bar engaging portions extending longitudinally beyond their pivot connections with adjacent links at least on the leading ends thereof, (c) the teeth in the chain being of the type that are filed at their outer ends and including cutting teeth of the raker type, (d) the teeth in the chain being arranged relative to the links devoid of cutting teeth such that the line of action of a resultant force projecting in the trailing direction of saw chain movement from the wood-engaging tip of a leading tooth intercepts a line between pivot centers at a point no farther rearward of the leading pivot center of the link devoid of cutting teeth connected to the next trailing tooth link than a distance F determined by the equation $$F/E = T/B$$

wherein E is the length of the leading saw bar engaging portion of the link devoid of cutting teeth, T is the spacing between pivot centers on the cutting tooth link, and B is the spacing between pivot centers on the link devoid of cutting teeth, (e) the wood-engaging tip of each tooth terminating between the associated line of action and the saw bar throughout the operative length of said tooth, (f) each raker tooth having a leading edge provided with a positive rake angle, and which edge forms with a line extending between its pivot centers an included angle greater than the corresponding included angle between said pivot center line and the line of action, (g) whereby the line of action associated with each raker tooth progresses in the direction of saw chain movement as the tooth is worn and resharpened.

References Cited

UNITED STATES PATENTS 2,327,233   8/1943   Wolf _____ 143—32

DONALD R. SCHRAN, *Primary Examiner.*